US008844205B2

(12) United States Patent
Michael et al.

(10) Patent No.: US 8,844,205 B2
(45) Date of Patent: Sep. 30, 2014

(54) COMPRESSED ELASTOMER DAMPER FOR EARTHQUAKE HAZARD REDUCTION

(71) Applicant: The Penn State Research Foundation, University Park, PA (US)

(72) Inventors: Robert J. Michael, Waterford, PA (US); Shannon K. Sweeney, Erie, PA (US); Ernest B. Ferro, Corry, PA (US); Richard Sause, Jr., Hellertown, PA (US); James M. Ricles, Bethlehem, PA (US); Akbar Mahvashmohammadi, Bethlehem, PA (US); Jeffrey A. Ferro, Corry, PA (US)

(73) Assignees: The Penn State Research Foundation, University Park, PA (US); Lehigh University, Bethlehem, PA (US)

( * ) Notice: Subject to any disclaimer, the term of this patent is extended or adjusted under 35 U.S.C. 154(b) by 0 days.

(21) Appl. No.: 13/735,637

(22) Filed: Jan. 7, 2013

(65) Prior Publication Data

US 2013/0174501 A1    Jul. 11, 2013

Related U.S. Application Data

(60) Provisional application No. 61/583,877, filed on Jan. 6, 2012.

(51) Int. Cl.
| E04H 9/00 | (2006.01) |
| E04B 1/98 | (2006.01) |
| F16F 7/09 | (2006.01) |
| F16F 9/30 | (2006.01) |

(52) U.S. Cl.
CPC ............... *F16F 9/303* (2013.01); *E04B 1/985* (2013.01); *F16F 7/09* (2013.01)

USPC .............................................. 52/1; 52/167.8

(58) Field of Classification Search
USPC ........ 52/1, 167.1, 467.6, 167.7, 167.8, 573.1; 188/297
See application file for complete search history.

(56) References Cited

U.S. PATENT DOCUMENTS

| 5,540,522 A | 7/1996 | Launaro et al. |
| 5,946,866 A * | 9/1999 | Weglewski et al. .......... 52/167.1 |
| 6,141,919 A | 11/2000 | Robinson |

(Continued)

OTHER PUBLICATIONS

Ricles, J.M. et al., "Experimental Validation of Performance-Based Seismic Design of Building Systems with Dampers Using Real-Time Hybrid Simulation," Proceedings of the 3rd International Conference on Advances in Experimental Structural Engineering, San Francisco, CA, Oct. 15-16, 2009.

(Continued)

*Primary Examiner* — Jessica Laux
(74) *Attorney, Agent, or Firm* — Gifford, Krass, Sprinkle, Anderson & Citkowski, P.C.; Douglas L. Wathen

(57) ABSTRACT

A passive damper for earthquake hazard reduction includes an inner member received in an outer member, with an elastomeric material disposed in the gaps between the inner and outer member. The elastomeric material has at least a first and a second portion. The first portion is bonded or connected to both the inner member and outer member such that no slippage occurs between the members and the material. The second portion is not bonded or connected to at least one of the inner and outer members such that slippage may occur.

19 Claims, 7 Drawing Sheets

(56) References Cited

U.S. PATENT DOCUMENTS

| | | | |
|---|---|---|---|
| 6,220,410 B1* | 4/2001 | Robinson | 188/371 |
| 7,322,451 B2 | 1/2008 | Okimura et al. | |
| 7,565,957 B2* | 7/2009 | Mochimaru et al. | 188/297 |
| 7,987,639 B2 | 8/2011 | Christopoulos et al. | |
| 8,002,093 B2* | 8/2011 | Mochimaru et al. | 188/297 |
| 8,250,818 B2* | 8/2012 | Tremblay et al. | 52/167.3 |
| 2009/0260304 A1* | 10/2009 | Mochimaru et al. | 52/167.1 |
| 2009/0293380 A1* | 12/2009 | Sasaki et al. | 52/167.6 |

OTHER PUBLICATIONS

Ricles, J.M., et al., "Performance Assessment of Building Systems with Elastomeric Dampers Using Real-Time Hybrid Simulation," Proceedings, 9th US National and 10th Canadian Conference on Earthquake Engineering, Toronto, Jul. 25-29, 2010.

Ricles, J.M. et al., "Performanced-Based Seismic Design of Building Systems with Dampers: Experimental Validation Using Real-Time Hybrid Simulation," Proceedings of the 7th International Conference on Urban Earthquake Engineering (7CUEE) & 5th International Conference on Earthquake Engineering (5ICEE), Mar. 3-5, 2010, Tokyo Institute of Technology, Tokyo, Japan.

Karavasilis, Theodore L et al., "Sesimic design and evaluation of steel moment-resisting frames with compressed elastomer dampers," Earthquake Engineering and Structural Dynamics, 41:411-429, 2012.

Karavasilis, Theodore L. et al., "Large-scale real-time hybrid simulation of steel MRFs equipped with compressed elastomer dampers," Stessa 2009, Proceedings of the 6th International Conference on Behavior of Steel Structures in Seismic Areas, Philadelphia, PA, Aug. 16-20, 2009, pp. 67-72.

Karavasilis, Theodore L. et al., "Seismic design and evaluation of steel MRFs with compressed elastomer dampers," STESSA 2009, Proceedings of the 6th International Conference on Behavior of Steel Structures in Seismic Areas, Philadelphia, PA, Aug. 16-20, 2009, pp. 101-107.

Kontopanos, Angela, "Experimental Investigation of a Prototype Elastomeric Structural Damper," M.S. Thesis, Department of Civil and Environmental Engineering, Lehigh University, Bethlehem, PA, 2006.

Karavasilis, Theodore L. et al., "Experimental Evaluation of the Seismic Performance of Steel Buildings with Passive Dampers Using Hybrid Simulation," Chapter 17 in Role of Seismic Testing Facilities in Performance-Based Earthquake Engineering, Fardis, M.N. and Rakicevic, Z.T., editors, Springer Sciences and Business Media B.V., 2012 (DOI: 10.1007/978-94-007-1977-4).

Ricles, J.M. et al., "Performance-based seismic design and experimental evaluation of steel MRFs with compressed elastomer dampers," Proceedings, ACES Workshop: Advances in Performance-Based Earthquake Engineering, Corfu, Greece, Jul. 4-7, 2009.

Karavasilis, T.L., et al., "Design of Steel Buildings for Earthquake Conditions Using Next-Generation Elastomeric Dampers," Proceedings of the 2010 Structures Congress, Orlando, FL, May 12-15, 2010.

Karavasilis, T.L., et al., "Use of Real-Time Hybrid Simulation to Evaluate the Performance-Based Seismic Design of Steel MRFs with Compressed Elastomer Dampers," Proceedings of the 2010 Structures Congress, Orlando, FL, May 12-15, 2010.

Karavasilis, T.L., et al., "Seismic Design and Performance of Steel MRFs with Elastomeric Dampers," Proceedings, 9th US National and 10th Canadian Conference on Earthquake Engineering, Toronto, Jul. 25-29, 2010.

Karavasilis, T.L., "Experimental evaluation of the seismic performance of steel MRFs with compessed elastomer dampers using large-scale real-time hybrid simulation," Engineering Structures, 33(6):1859-1869, 2011.

* cited by examiner

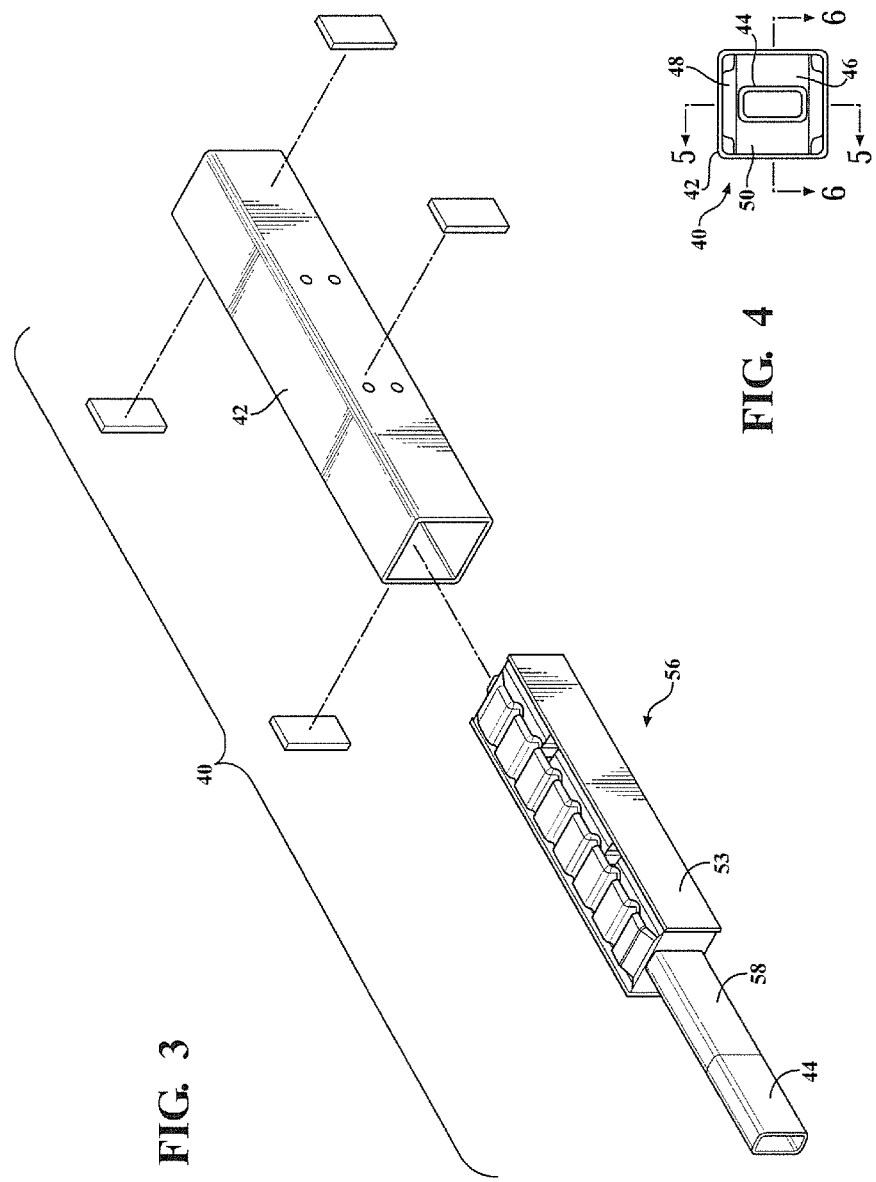

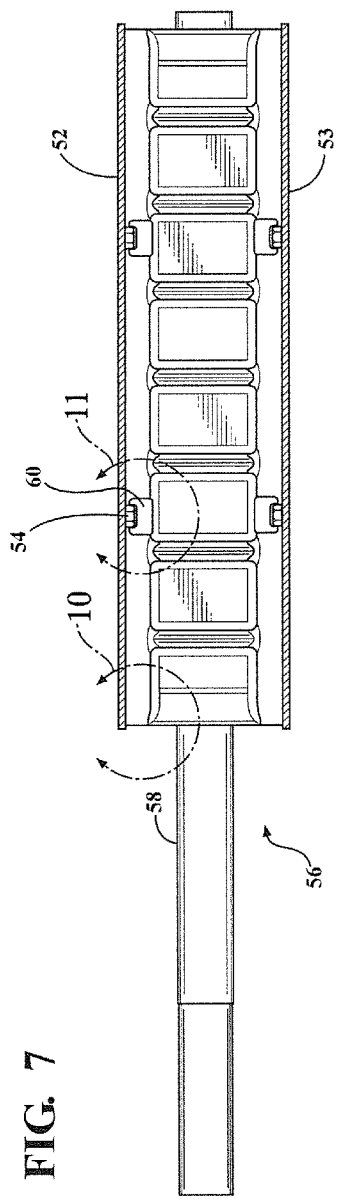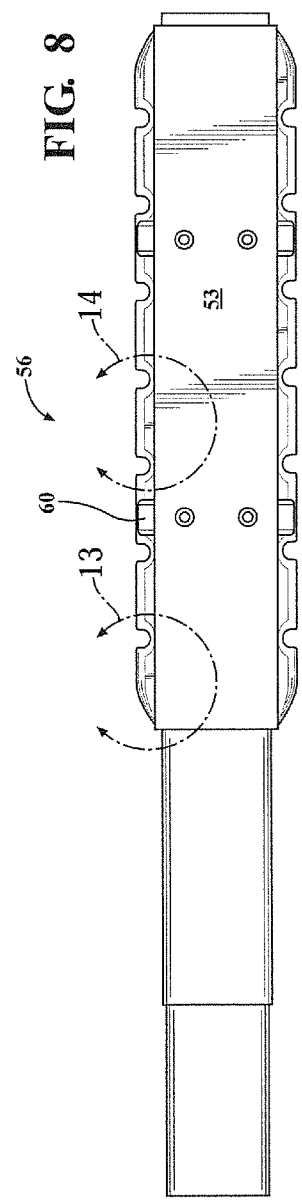

COMPRESSED ELASTOMER DAMPER FOR EARTHQUAKE HAZARD REDUCTION

REFERENCE TO RELATED APPLICATION

This patent application claims priority from U.S. provisional patent application Ser. No. 61/583,877, filed Jan. 6, 2012, the entire content of which is incorporated herein by reference.

STATEMENT OF GOVERNMENT SPONSORSHIP

This invention was made with government support under Grant No. CMS0936610, awarded by the National Science Foundation. The Government has certain rights in the invention.

BACKGROUND OF THE INVENTION

Passive dampers have been used in the construction of buildings to improve the seismic performance of these buildings. The passive damping systems can reduce drift and inelastic deformation demands on the members of the primary lateral load resisting system, in addition to reducing the velocity and acceleration demands on non-structural components. Passive dampers include viscoelastic and high damping elastomeric dampers.

SUMMARY OF THE INVENTION

The present invention provides improved passive dampers for earthquake hazard reduction in building systems. Some embodiments of the present invention provide a passive damper that provides hysteretic-like damping under small strains and both hysteretic-like and friction-like damping under large strains. A damper in accordance with an embodiment of the present invention has an elongated outer member and an elongated inner member with the inner member received inside of the outer member. An elastomeric damping material may be compressed between the inner member and outer member. Some of this elastomeric material may be bonded or attached to both the inner member and outer member such that relative longitudinal movement between the inner member and outer member results in shear strain in the elastomeric material, resulting in hysteretic-like damping. Other portions of the elastomeric damping material may not be bonded to one or both of the inner member and outer member such that large longitudinal relative movements between the inner member and outer member result in slipping of the elastomeric material with respect to at least one of the members. This leads to friction-like damping under large strains.

BRIEF DESCRIPTION OF THE DRAWINGS

FIG. 3 is an exploded perspective view of the damper of FIG. 2, showing some of its component parts;

FIG. 4 is an end view of the damper of FIG. 2;

FIG. 7 is a top view of the inner assembly of the damper of FIGS. 2-6;

FIG. 8 is a side view of the inner assembly of the damper of FIGS. 2-7;

DETAILED DESCRIPTION OF THE INVENTION

The present invention provides a passive damper that provides hysteretic-like damping under small strains and both hysteretic-like and friction-like damping under large strains. A damper in accordance with an embodiment of the present invention has an elongated outer member and an elongated inner member with the inner member received inside of the outer member. An elastomeric damping material may be compressed between the inner member and outer member. Some of this elastomeric material may be bonded or attached to both the inner member and outer member such that relative longitudinal movement between the inner member and outer member results in shear strain in the elastomeric material, resulting in hysteretic-like damping. Other portions of the elastomeric damping material are not bonded to one or both of the inner member and outer member such that large longitudinal relative movements between the inner member and outer member result in slipping of the elastomeric material with respect to at least one of the members. This leads to friction-like damping under large strains.

Figure 1:
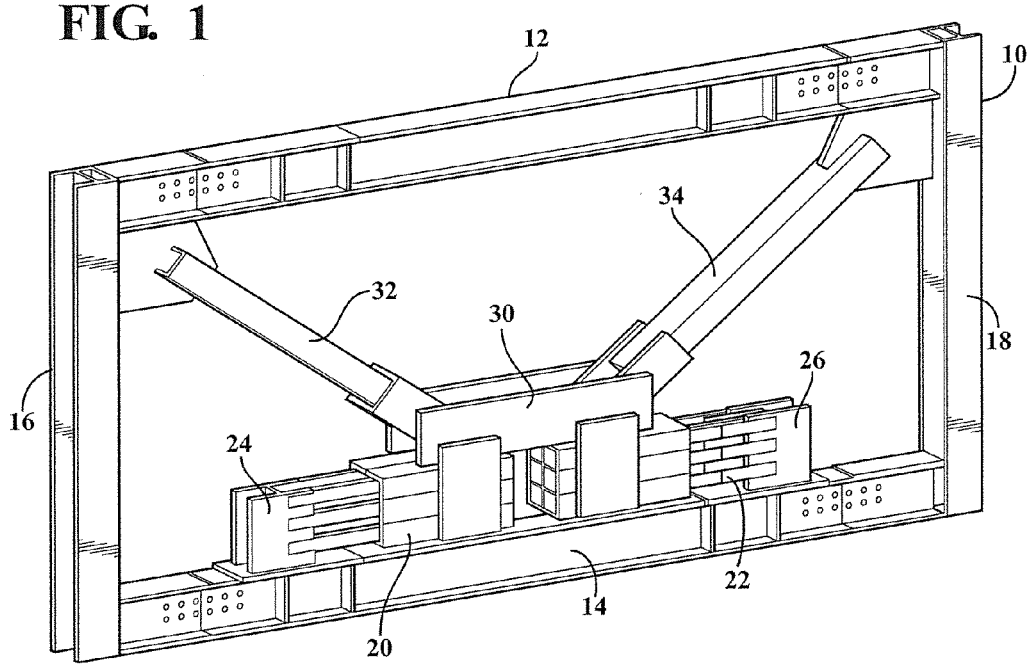
FIG. 1 is a perspective view of a steel frame with dampers according to the present invention installed therein.

As known to those of skill in the art, passive dampers may be used in various ways so as to reduce earthquake hazards in buildings. FIG. 1 illustrates an exemplary steel frame 10 representing a portion of a building structure. The frame 10 includes a pair of spaced apart horizontal members 12 and 14 interconnected by a pair of spaced apart vertical members 16 and 18. These represent portions of a building structure, and may take a wide variety of forms other than the illustrated form. In order to damp earthquake-induced displacement of the members 12-18, a first plurality of dampers 20 and a second plurality of dampers 22 are provided. A first attachment 24 interconnects the dampers 20 with the lower horizontal member 14 and a second attachment 26 attaches the second plurality of dampers 22 with the lower horizontal member 14. The opposite ends of the dampers 20 and 22 are connected to a connection member 30. Diagonal brace members 32 and 34 extend from the connection member 30 to the upper corners of the frame 10. As will be clear to those of skill in the art, earthquake-induced distortions of the frame 10 will cause the connection member 30 to move relative to the attachments 24 and 26. Because the dampers 20 and 22 extend between the attachments 24 and 26 and connector 30, such movement displaces at least some of the dampers and the dampers are therefore effective in damping the distortion of the frame 10.

Figure 2:
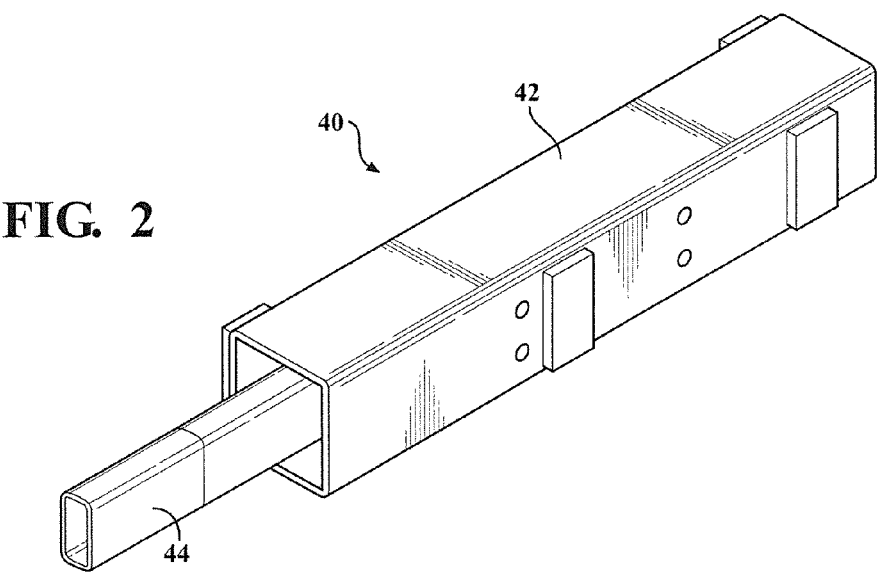
FIG. 2 is a perspective view of an embodiment of a damper in accordance with the present invention.

An exemplary damper in accordance with an embodiment of the present invention is shown at 40 in FIGS. 2 and 3. The damper has an elongated outer member 42 and an elongated inner member 44. In this embodiment, the outer member 42 is an elongated steel tube with a generally square cross section. The inner member 44 is an elongated generally rectangular steel tube sized to be received inside the outer member 42 with a gap above, below, and to both sides of the inner member 44. An elastomeric material 46 is disposed between the inner member 44 and outer member 42.

Referring now to FIG. 4, it can be seen that in this embodiment the rectangular cross section inner member 44 is arranged with its longer cross-sectional dimension vertically and its narrower dimension horizontally. It should be understood that all references to vertical, horizontal, up, down, and other such descriptors are for reference purposes only, with it being understood that a damper in accordance with the present invention may be positioned and configured other than illustrated. As shown in FIG. 4, this positioning of the inner member 44 leaves a small space between its upper and lower surfaces and the corresponding inner surfaces of the outer member 42 and larger spaces between its side surfaces and the corresponding inner surfaces of the outer member 42. As such, in this embodiment, a thinner layer of elastomeric material is provided above and below the inner member 44 and a thicker layer of elastomeric material is provided to the sides of the inner member 44.

The elastomeric material 46 between the outer member 42 and inner member 44 is preferably pre-compressed prior to assembly of the damper 40. That is, the dimensions of the elastomeric material 46 would be larger, side to side and top to bottom, if the elastomeric material were not constrained by the outer member 42. The amount of compression of the elastomeric material may be altered depending on the performance characteristics desired. In one exemplary embodiment, the target pre-compression for the thinner portions was 5% and for the thicker portions was 11%. Other amounts may be used. This pre-compression provides a number of benefits, including putting the bond in compression for improved durability and putting the elastomer in compression for improved durability and increased allowable displacement. Pre-compressed elastomer sections can also offer the additional benefit of reduced stiffness since the shear modules of the material decreases with increasing compression strain as a result of pre-compression.

Figure 5:
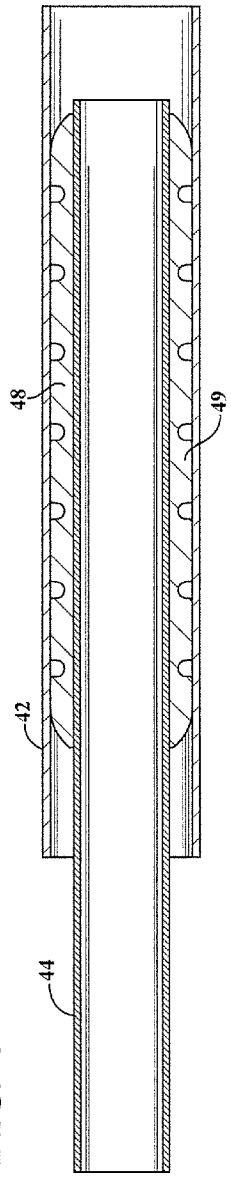
FIG. 5 is a cross-sectional view of the damper of FIGS. 2-4, taken along lines 5-5 of FIG. 4.
Figure 6:
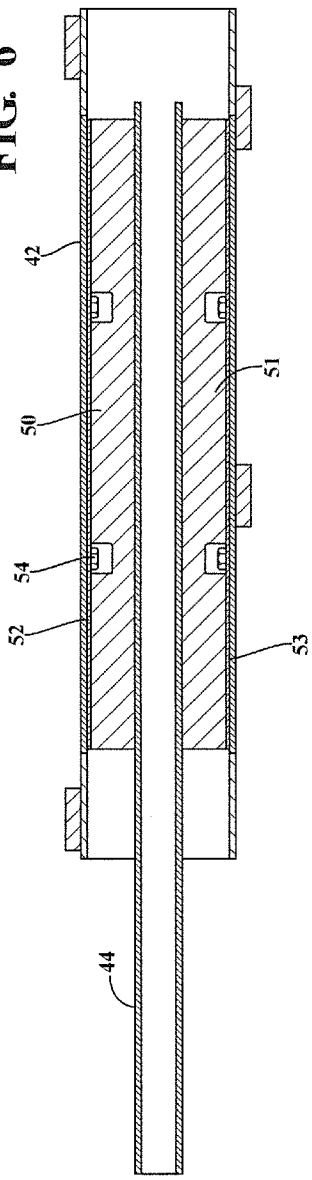
FIG. 6 is a cross-sectional view of the damper of FIGS. 2-4, taken along lines 6-6 of FIG. 4.

FIG. 5 shows a cross-sectional view of the damper 40 of FIG. 4, taken along lines 5-5. FIG. 6 shoes a cross-sectional view of the damper 40 of FIG. 4, taken along lines 6-6. FIG. 5 is a vertical cross section, so it shows the thinner layer of elastomeric material. While in some embodiments the elastomeric material is all one material, it is convenient to discuss the thinner layer above and below the inner tube 42, shown in FIG. 5, as if it is distinct from the thicker layer to the sides of the inner tube 44, shown in FIG. 6. In alternative embodiments, the elastomeric material may be different in different portions of the damper and/or the materials may be separated from each other. For ease of reference, the thinner layers of elastomeric material, best shown in FIG. 5, will be referred to as portions 48 and 49 while the thicker layers of elastomeric material, shown in FIG. 6, will be referred to as portions 50 and 51.

In the illustrated embodiment, the portions 48 and 49, corresponding to the thinner portions, are bonded to the inner member 42 but are not bonded to the outer member 44. The elastomeric portions 48 and 49 are pre-compressed such that they exert an outward force on the outer member 44. Pre-compression of the elastomeric material improves its performance characteristics and also increases the friction between the elastomeric material and the inner surface of the outer member 44. As will be clear to those of skill in the art, small displacements of the inner member 42 relative to the outer member 44 will cause strain in the elastomeric portions 48 and 49. As the displacements get larger, there will be slipping between the elastomeric portions 48 and 49 and the inner surfaces of the outer member 44. This provides a combination of hysteretic-like damping under small displacements and both hysteretic-like and friction-like damping under larger displacements. Referring back to FIG. 3, it can be seen that the elastomeric material 46 may have a convoluted upper surface where it contacts the inner surface of the outer member 42. The lower surface may be similarly configured. In alternative embodiments, the surfaces may be configured differently.

Figure 11:
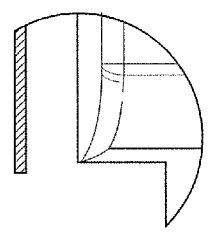
FIG. 11 is a detailed view of the portion of FIG. 7 shown at 11.
Figure 12:
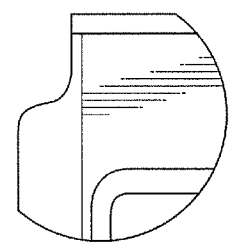
FIG. 12 is a detailed view of the portion of FIG. 9 shown at 12.
Figure 13:
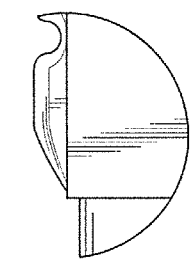
FIG. 13 is a detailed view of the portion of FIG. 8 shown at 13.
Figure 14:
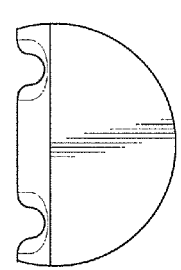
FIG. 14 is a detailed view of the portion of FIG. 8 shown at 14.

Referring now to FIG. 6, the thicker portions of elastomeric material are shown at 50 and 51. In this embodiment, these elastomeric portions 50 and 51 are bonded to the inner member 44 and also interconnected with the outer member 42. Referring to FIG. 3, thin metal plates 52 and 53 may be bonded to the outer surfaces of the elastomeric portions 50 and 51. The thin plates 52 and 53 may then be attached to the outer member 42 using fasteners 54. In the illustrated embodiment, the interconnection between the plates 52 and 53 and the elastomer portions 50 and 51, respectively, is enhanced by metal channels 60 that are partially embedded in and bonded to the elastomer portions 50 and 51. These are best shown in FIGS. 7, 8 and 11. In this version, the fasteners 54 are nuts welded to the thin plates and these nuts are received by the channels 60. Other approaches of attaching the plates to the elastomeric material and/or attaching the elastomeric material to the outer member may be used.

Because the thicker portions 50 and 51 are interconnected with both the outer member 42 and inner member 44, relative displacements of the members 42 and 44 result in strain in the elastomer portions. Because the elastomers portions 50 and 51 are thicker, they can tolerate greater displacement than the thinner portions 48 and 49. The combination of the thin portions that may slip and the thick portions that may not slip provides desirable performance characteristics. In some embodiments, the damper is stiffer at small deformations and becomes more flexible as deformation increases. As the excitation frequency increases, the damper may become stiffer and dissipate more energy.

Referring again to FIG. 3, the combination of the inner member 44, the elastomeric material 46, and the plates 52 and 53 may be referred to as an inner assembly 56. The elastomeric material, in this embodiment, is bonded to the inner member 44 and to the thin plates 52 and 53. The assembly 56 is then compressed and inserted into the outer member 42 and fasteners are used to interconnect the thin plates 52 and 53 with the outer member 42. FIG. 7 provides a top view of the inner assembly 46. All of the Figures are to scale for a particular embodiment, and relative dimensions for this embodiment may be determined from the Figures. FIG. 7 also illustrates that elastomeric material 46 may coat a portion of the inner member 44 that extends out of the outer tube. This coating portion is shown in FIGS. 3 and 7 at 58.

FIG. 8 provides a side view of the inner assembly 56.

Figure 9:
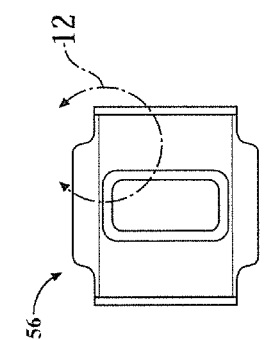
FIG. 9 is an end view of the inner assembly of FIGS. 7 and 8.
Figure 10:
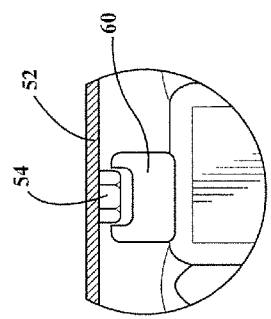
FIG. 10 is a detailed view of the portion of FIG. 7 shown at 10.

FIG. 9 provides an end view of the inner assembly 56. FIGS. 10-14 provide detailed views of the portions of FIGS. 7-9 indicated as 10-14, respectively. Each of these detailed views shows particular details of the shape of portions of certain embodiments of a damper in accordance with the present invention. Alternative embodiments may be configured differently and have different shapes and/or relative dimensions.

In one exemplary version of the invention, the thin portions of the elastomeric material have a thickness, when assembled, of approximately 0.75 to 0.8 inches while the thicker portions have a thickness, when assembled, of approximately 1.5-1.6 inches. In this version, the inner member has an outside dimension of approximately 1.5 by 3.0 inches and the outer member has an end-to-end length of 27 inches. In this example, the thicker portions are approximately twice as thick as the thinner portions. This ratio may be preferred for some embodiments. In further embodiments, the thicker portions may have a thickness of 1.5-3.0 times the thickness of the thinner portions.

As discussed previously, it is preferred that the elastomeric material be compressed from its uncompressed thickness when the damper is assembled, and in one example the target compression of the thin portions was 5% and of the thicker portions was 11%. In some embodiments, compression in the range of 1.5% to 20% is preferred, with 5% to 15% being more preferred. Also, for some embodiments it is preferred that the thicker portions be compressed by a greater amount than the thinner portions. For example, the compression of the thicker portions may be in the range of 1.5 to 10 times the compression of the thinner portions in some versions.

It will be understood by those of skill in the art that the specific dimensions and configuration of a damper in accordance with the present invention will depend on the desired performance characteristics, and the dimensions and configurations may be adjusted to achieve the desired results.

Figure 15:
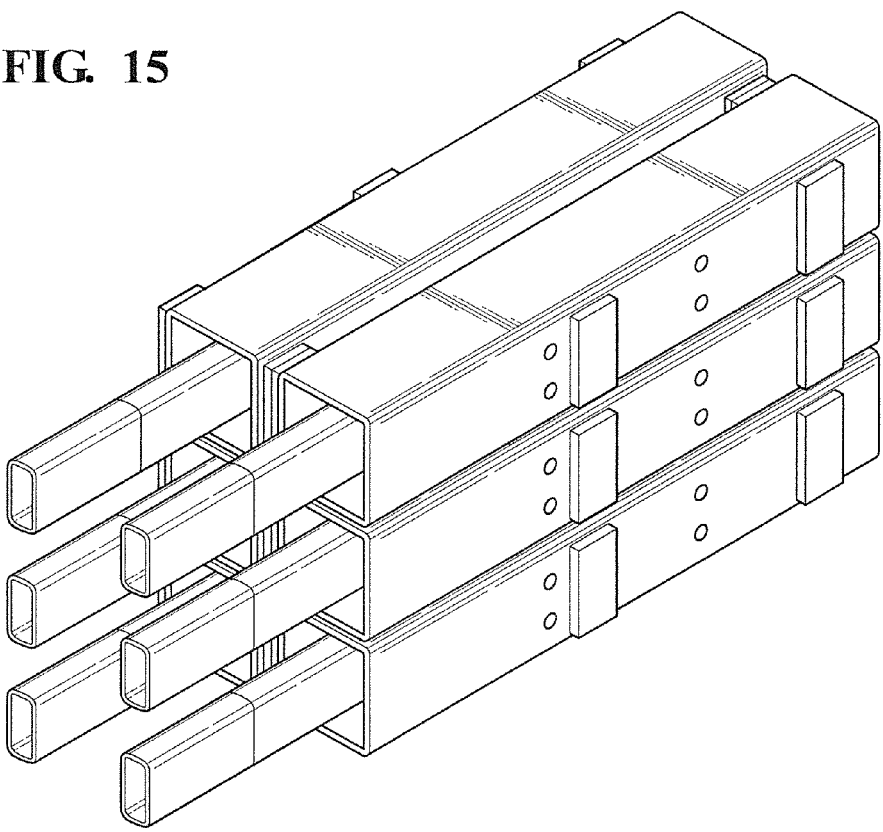
FIG. 15 is a perspective view of an assembly of multiple dampers in accordance with the present invention.
Figure 16:
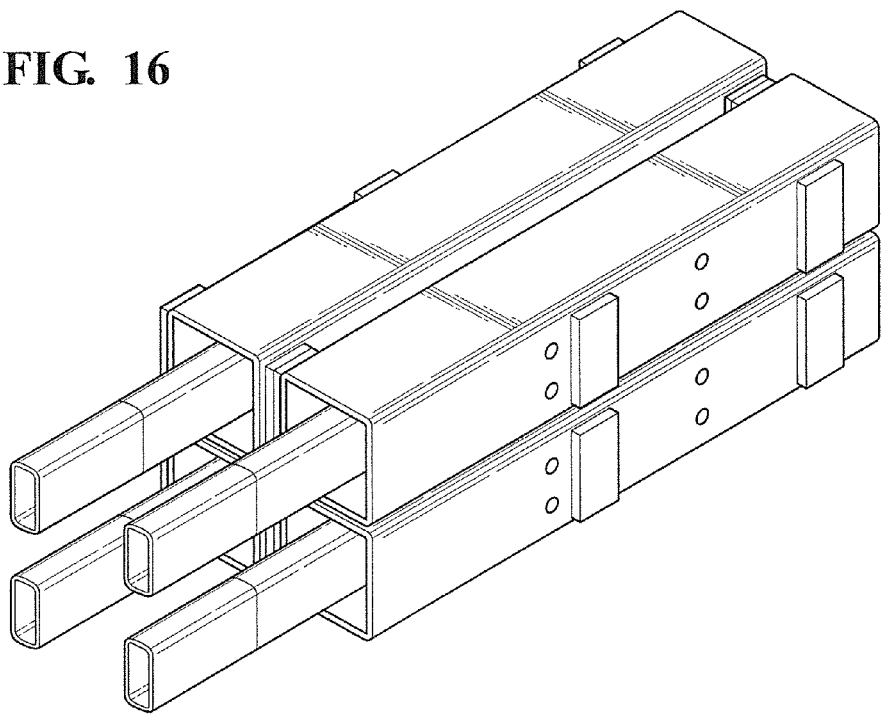
FIG. 16 is a perspective view of another assembly of dampers in accordance with the present invention.

FIGS. 15 and 16 illustrate how multiple dampers may be assembled into a damper assembly for use in building systems. As will be clear to those of skill in the art, other assemblies may also be provided. In each example, a frame of some type is configured to form a portion of a building, such as a portion of a wall. The dampers are interconnected with the frame such that distortion of the frame causes displacement of at least some of the dampers.

As will be clear to those of skill in the art, the herein disclosed embodiments of the present invention may be altered in various ways without departing from the scope or teaching of the present invention. It is the following claims, including all equivalents, which define the scope of the present invention.

The invention claimed is:

1. A passive damper for earthquake hazard reduction, comprising:
    an elongated outer member having an inner surface;
    an elongated inner member received in the outer member, the inner member having an outer surface, gaps being defined between the outer surface of the inner member and the inner surface of the outer member;
    the inner member being displaceable relative to the outer member along a longitudinal axis;
    an elastomeric material disposed in the gaps between the inner member and outer member, the elastomeric material having at least a first portion and a second portion;
    the first portion of the elastomeric material extending between the inner member and outer member, the first portion having an outer surface and an inner surface, the first portion being bonded or mechanically connected to both the inner member and outer member such that the outer surface of the first portion is held in position on the inner surface of the outer member and the inner surface of the first portion is held in position on the outer surface of the inner member when the inner member is longitudinally displaced relative to the outer member;
    the second portion of the elastomeric material extending between the inner member and outer member, the second portion having an outer surface and an inner surface, the second portion not being bonded or mechanically connected to at least one of the inner and outer members such that the inner surface of the second portion may slip on the outer surface of the inner member and/or the outer surface of the second portion may slip on the inner surface of the outer member when the inner member is longitudinally displaced relative to the outer member.

2. A passive damper in accordance with claim 1, wherein:
    the outer surface of the inner member and the inner surface of the outer member each have 4 faces, the gaps between the inner and outer member being four gaps, each gap being defined between one of the faces of the outer surface of the inner member and an opposed one of the faces of the inner surface of the outer member; and
    the elastomeric material having a third portion and a fourth portion, each of the portions of the elastomeric material being disposed in one of the four gaps.

3. A passive damper in accordance with claim 2, wherein:
    the third portion of the elastomeric material extends between the inner member and outer member and is disposed on an opposite side of the inner member from the first portion, the third portion having an outer surface and an inner surface, the third portion being bonded or mechanically connected to both the inner member and outer member such that the outer surface of the third portion is held in position on the inner surface of the outer member and the inner surface of the third portion is held in position on the outer surface of the inner member when the inner member is longitudinally displaced relative to the outer member; and
    the fourth portion of the elastomeric material extends between the inner member and outer member and is disposed on an opposite side of the inner member from the second portion, the fourth portion having an outer surface and an inner surface, the fourth portion not being bonded or mechanically connected to at least one of the inner and outer members such that the inner surface of the fourth portion may slip on the outer surface of the inner member and/or the outer surface of the fourth portion may slip on inner surface of the outer member when the inner member is longitudinally displaced relative to the outer member.

4. A passive damper in accordance with claim 3, wherein the portions of the elastomeric material each have a thickness, the thickness of the first and third portions being greater than the thickness of the second and fourth portions.

5. A passive damper in accordance with claim 4, wherein the portions of the elastomeric material each have an uncompressed thickness prior to assembly into the outer member and a compressed thickness when the assembled into the outer member, the compressed thickness being less than the uncompressed thickness by 1.5 to 20%.

6. A passive damper in accordance with claim 5, wherein the first and third portions are compressed 1.5 to 10 times as much as the second and fourth portions when assembled into the outer member.

7. A passive damper in accordance with claim 4, wherein the first and third portions have a thickness in the range of 1.5 to 3.0 times the thickness of the second and fourth portions.

8. A passive damper in accordance with claim 3, wherein: the first and third portions of elastomeric material each have a metal plate bonded to the outer surface, the metal plate being attached to the inner surface of the outer member.

9. A passive damper in accordance with claim 3, wherein the portions of the elastomeric material are portions of a continuous elastomeric body.

10. A passive damper in accordance with claim 3, wherein the outer surface of the second and fourth portions are convoluted such that only parts of the outer surface contact the inner surface of the outer member.

11. A passive damper in accordance with claim 1, wherein: the portions of the elastomeric material each have a thickness, the thickness of the first portion being greater than the thickness of the second portion.

12. A passive damper in accordance with claim 11, wherein the first portion has a thickness in the range of 1.5 to 3.0 times the thickness of the second portion.

13. A passive damper in accordance with claim 1, wherein the portions of the elastomeric material each have an uncompressed thickness prior to assembly into the outer member and a compressed thickness when the assembled into the outer member, the compressed thickness being less than the uncompressed thickness by 1.5 to 20%.

14. A passive damper in accordance with claim 13, wherein the first portion is compressed 1.5 to 10 times as much as the second portion when assembled into the outer member.

15. A passive damper in accordance with claim 1, wherein: the first portion of elastomeric material has a metal plate bonded to the outer surface, the metal plate being attached to the inner surface of the outer member.

16. A passive damper in accordance with claim 1, wherein the first and second portions of elastomeric material are portions of a continuous elastomeric body.

17. A passive damper in accordance with claim 1, wherein the outer surface of the second portion is convoluted such that only parts of the outer surface contact the inner surface of the outer member.

18. A building component, comprising:

a frame configured to form a portion of a building;

a plurality of dampers in accordance with claim 1;

the plurality of dampers being interconnected with the frame such that distortion of the frame causes displacement of the inner member relative to the outer member of at least some of the dampers, whereby the dampers damp distortion of the frame.

19. A building component in accordance with claim 18, wherein the frame has at least a first member and a second member, some of the plurality of the dampers having a first end interconnected with the first member and a second end interconnected with the second member.

* * * * *